Aug. 5, 1958  A. M. DAVIS  2,846,250

FASTENING AND ADJUSTMENT OF REAR FRAME STRUTS

Filed Aug. 21, 1956

INVENTOR
A. M. DAVIS
BY: *Maybee & Legris*
ATTORNEYS

United States Patent Office 2,846,250
Patented Aug. 5, 1958

2,846,250

FASTENING AND ADJUSTMENT OF REAR FRAME STRUTS

Arthur Marshall Davis, Van Nuys, Calif., assignor to Orenda Engines Limited, Malton, Ontario, Canada, a corporation Application August 21, 1956, Serial No. 605,395

6 Claims. (Cl. 287—58)

This invention relates to coupling assemblies and in particular to a coupling assembly which is designed to enable two members which are to be secured together to be adjusted within prescribed limits before being finally secured in place.

In any assembly where a member is to be supported by struts or similar mechanical members, difficulty is often encountered in accurately positioning, during the assembly operation, the member which is to be supported. Manufacturing tolerances in the parts which are being assembled often accumulate when two or more members are secured together with the result that the final assembly does not lie in the required position within the permissable limits.

Accordingly, a number of methods have been devised in the past whereby certain minor adjustments may be made during the assembly operation. As examples of these adjusting mechanisms one may consider a strut with a turnbuckle to adjust the longitudinal dimension of the member or the strut which is threaded over a large portion of its length and is provided with a threaded stop member which may be positioned to accurately control the effective length of the strut. Such a practice has certain disadvantages, chief among which is the tendency of such a structure to loosen during the working life of the device and to thereby cause a loosening of the assembly.

It is an object of the present invention to provide a coupling assembly which will be adjustable within certain prescribed limits and is adapted to secure two members together and which, if the retaining bolts should loosen slightly during use, will not result in displacement of the two members.

According to the invention an adjustable coupling assembly comprises a first member which is adapted to be secured to a second member, a slidable adjusting block which is adapted to lie between the two members, each of said members having a bearing face in contact with the block. Adjacent faces of the block and the second member have parallel, closely spaced serrations adapted to engage one another, the serrations being parallel to the longitudinal axis of the block. The opposite face of the block and the adjacent face of the first member also have parallel closely spaced serrations, these second mentioned serrations, however, lying at an angle to the longitudinal axis of the block. An aperture is provided in the first member which is of a diameter to snugly receive a bolt and an aperture is provided in the adjusting block which is adapted to align with the aperture in the first member and which is of a diameter greater than that of the aperture in the first member. A slot is provided in the second member which has a width substantially equal to the diameter of the aperture in the first member and which has its length extending normal to the direction of the serrations in the bearing face of said second member.

Referring now to the drawings in which one form of the invention is illustrated in detail and in which like reference numerals denote like parts in the various views it will be seen that:

Figure 1:
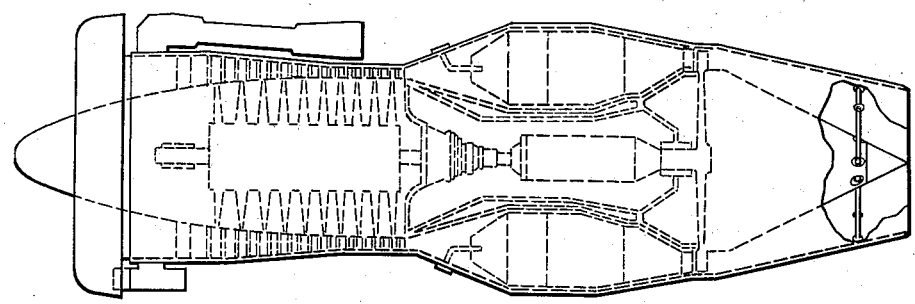
Figure 1 represents a schematic plan of an axial-flow gas-turbine engine, parts being broken away to show the environment of the invention.

Referring now to Figure 1 it will be seen that the invention has been embodied in the supporting struts and tailcone of an axial-flow gas-turbine engine. It is emphasized that this particular application of the invention is illustrative of one of its many applications and is not to be construed as limiting the invention to this particular use.

Figure 2:
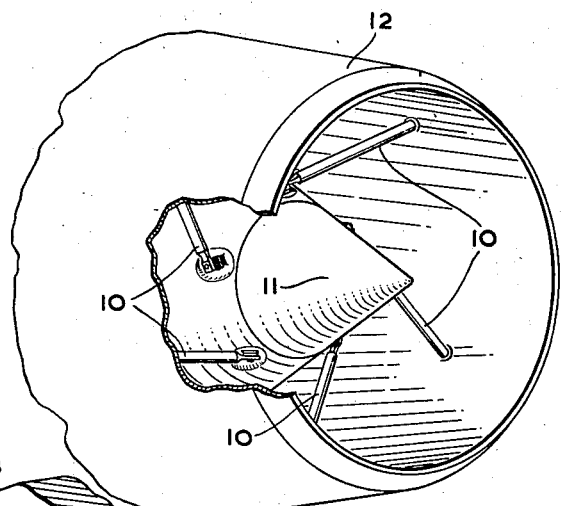
Figure 2 is a detailed perspective view of a portion of the engine shown in Figure 1.

In Figure 2, the cutaway portion of Figure 1 is more clearly illustrated and here it will be seen that the supporting struts 10 are used to support the tailcone 11 within the tailpipe 12. In an application such as this it is, of course, essential that the tailcone 11 be supported centrally within the substantially cylindrical tailcone 12 and, to this end, adjusting means have been provided whereby the effective length of the struts 10 may be altered slightly to enable the tailcone 11 to be positioned with extreme accuracy in the center of the tailpipe 12.

Figure 3:
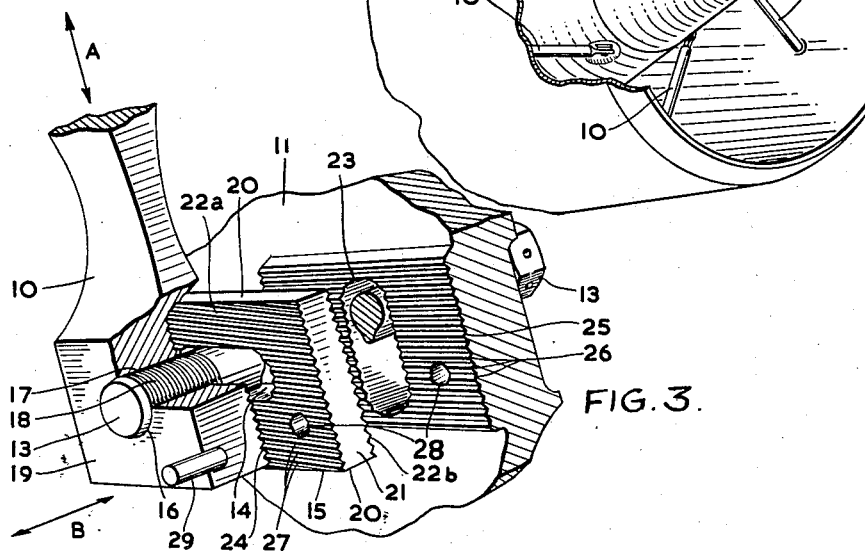
Figure 3 is a fragmentary, greatly enlarged, and partly exploded perspective view that shows the adjustable coupling assembly in detail, parts being broken away and shown in section.

Referring now to Figure 3 which illustrates in detail the adjusting mechanism it will be seen that the strut 10 which, hereafter, will be referred to as the first member is secured to the tailcone 11 which, hereafter, will be referred to as the second member, by means of a bolt 13 which passes through apertures in both the first member 10 and the second member 11 and also through an aperture 14 in an adjusting block 15.

The aperture 16 in the first member 10 is of a diameter substantially equal to that of the bolt 13 and may conveniently be provided with internally formed screw threads 17 adapted to engage the externally formed screw threads 18 on the bolt 13. Alternatively, the aperture 16 may have a smooth bore and the bolt 13 may be of a length sufficient to enable it to receive a nut on that portion which extends beyond a face 19 of the first member 10.

The adjusting block 15 is conveniently substantially rectangular in shape having a pair of opposed sides 20 which are of a length greater than a pair of opposed ends 21. The aperture 14 in this block defines a slot which is substantially centrally located in opposite parallel faces 22a and 22b of the block, the width of the slot being materially greater than the diameter of the aperture 16 in the first member 10. Conveniently, this slot may be of a width which is approximately twice that of the aperture 16 in the first member 10. The length of the slot extends parallel to the side 20 and is of a length which is materially greater than its width.

The second member 11 is provided also with a slot 23 which is of a width equal to the diameter of the bolt 13 and is of a length which may conveniently be approximately two to three times the diameter of the bolt. The longitudinal axis of the slot extends in a direction which will be parallel to the longitudinal axis of the first member 10 when it is in the mounting position.

Both the first and second members are provided with bearing faces 24 and 25 respectively, the bearing face 25 on the second member being provided with closely spaced parallel serrations 26 which lie in a direction normal to the direction of slot 23 in the second member. These serrations are adapted to mate with a co-operating set of serrations on the face 22b of the adjusting block 15, the serrations in the adjusting block lying parallel to the edge 20 thereof so that the block may slide in a direction parallel to its longitudinal axis along the serrations 26.

The opposite face, 22a, of block 15 is also provided with parallel, closely spaced serrations which, however, lie at a slight angle to the longitudinal axis of the block. These serrations 27 are adapted to engage with a set of co-operating serrations which lie parallel thereto in the bearing face 24 of the first member 10.

Considering now the operation of the coupling assembly it will be observed that when the members are assembled in the relative positions shown in Figure 3 the block 15 will enable the first member 10 to be adjusted in an axial direction by sliding the block 15 (in Figure 3) to either the left or the right to cause a movement in the first member 10 in a direction of the arrow A according to the direction of the movement of the block 15. Movement of the first member 10 in the direction of the arrow A will, of course, cause a similar movement in the bolt 13. However, the width of the slot 14 in member 15 is sufficient to accommodate this movement of the bolt and, of course, the slot 23 is oriented in such a manner that it will accommodate movement of the bolt 13 in this direction. The slot in member 15 is, of course, of a length sufficient to enable the longitudinal displacement of the block 15 to be effected over a distance sufficient to adjust the first member 10 within the limits prescribed by the particular application to which the adjustable coupling assembly is to be put.

When the first member 10 has been positioned in the desired location by means of longitudinally sliding block 15 along serrations 26 the bolt 13 may be tightened to clamp the three members rigidly together. However, it is conceivable that during the working life of the coupling assembly the bolt 13 might work loose. In an application such as has been described in this specification, the loosening of a strut might have very serious consequences and, accordingly, means are provided to reduce the danger of the loosening of the bolt to a minimum.

It has been mentioned above that both the aperture 16 in the first member 10 and the width of the slot 23 in the second member 11 are of such dimensions that the bolt snugly fits therein. Accordingly, if the block 15 remains fixed and is prevented from moving in a longitudinal direction there can be no displacement of the member 10 in the direction of the arrow A. Accordingly, when the first member 10 has been finally positioned in the desired location a hole is drilled through the exposed portion of the block 15 as shown at 28, the hole passing completely through the block 15 and into the bearing face 25 of the second member 11. A soft metallic pin which is a press fit in the hole is driven home to securely lock the two members against relative movement. Such a pin is illustrated at 29 in Figure 3.

In this condition it will be appreciated that before the first member 10 can move in an axial direction along the arrow A it will be necessary for the bolt 13 to have loosened to a point that the first member 10 may move in the direction of arrow B a distance which just exceeds the depth of the serrations 27. If the bolt should loosen to this degree then the first member 10 will be able to move freely in a direction parallel to the direction of arrow A. However, in applications where loosening of the bolts are to be expected due to excessive vibration of the structure it is assumed that the bolt 13 will be tightened periodically thereby preventing the possibility of loosening to this extreme degree. Mere minor loosening of the bolt 13, however, will not have any appreciable effect on the position of the first member 10 for the reasons which have been given above.

From the foregoing description and the accompanying drawings it will be appreciated that an adjustable coupling assembly has been provided which enables the relative positions of the two members to be readily adjusted within certain limits and which will resist displacement of either member should the retaining mechanisms, in this instance, a bolt, loosen slightly during the working life of the device.

While the invention has been described in detail in connection with a specific embodiment it is to be appreciated that many modifications may be made in the application of the device and in the structure of the component parts within the limits of the subjoined claims.

What I claim is:

1. An adjustable coupling assembly comprising a first member which is adapted to be secured to a second member, a slidable adjusting block adapted to lie between the two members, each of said members having a bearing face in contact with the block, adjacent faces of the block and the second member having parallel, closely spaced serrations adapted to engage one another, the serrations being parallel to the longitudinal axis of the block, the opposite face of the block and the adjacent face of the first member also having parallel, closely spaced serrations, the second-mentioned serrations lying at an angle to the longitudinal axis of the block, an aperture in the first member of a diameter to snugly receive a bolt, an aperture in the adjusting block adapted to align with the aperture in the first member and of a diameter greater than that of the aperture in the first member, and a slot in the second member having its width substantially equal to the diameter of the aperture in the first member and its length extending normal to the direction of the serrations in the bearing face of said second member.

2. An adjustable coupling assembly as claimed in claim 1 in which the sides of the slidable adjusting block carrying the serrations are parallel.

3. An adjustable coupling assembly as claimed in claim 1 in which the aperture in the adjusting block is a slot having a width which is greater than the diameter of the aperture in the first member and a length which is greater than the width and which extends in a direction parallel to the direction of the serrations in the second member.

4. An adjustable coupling assembly as claimed in claim 1 in which means are provided to lock the adjusting block to one of the two members to prevent relative sliding movement therebetween.

5. A method of positioning, by means of an adjusting block, a first member and a second member which are to be secured together, each of said members having a bearing face in contact with the block, adjacent faces of the block and the second member having parallel, closely spaced serrations adapted to engage one another, the serrations being parallel to the longitudinal axis of the block, the opposite face of the block and the adjacent face of the first member also having parallel, closely spaced serrations, the second-mentioned serrations lying at an angle to the longitudinal axis of the block, the first member having an aperture therein of a diameter to snugly receive a bolt, an aperture in the adjusting block adapted to align with the aperture in the first member and a slot in the second member having its width substantially equal to the diameter of the aperture in the first member and its length extending normal to the direction of the serrations in the bearing face of the second member comprising the steps of placing the block in contact with the second member with the mating serrations in engagement with one another, placing the first member in contact with the face of the block remote from the face in contact with the second member, aligning the apertures in the three members and passing a bolt therethrough and then sliding the block in a direction parallel to its longitudinal axis to cause the first member which is in engagement with the serrations lying at an angle to the longitudinal axis of the block to move in a direction normal to the direction of the serrations in the second member in accordance with the movement of the block in a direction parallel to the serrations in the second member and, when the first member is properly positioned, tightening the bolt.

6. A method as claimed in claim 5 in which, after the bolt has been tightened, a hole is drilled through an exposed portion of the adjusting block and into the second member and a pin which is a force fit within the holes is driven home to lock the block to the second member.

References Cited in the file of this patent

UNITED STATES PATENTS

| | | |
|---|---|---|
| 789,344 | Wattie | May 9, 1905 |
| 1,019,872 | Williams | Mar. 12, 1912 |
| 2,077,620 | Dicke | Apr. 20, 1937 |